(12) United States Patent
Shihoh et al.

(10) Patent No.: US 9,348,150 B2
(45) Date of Patent: May 24, 2016

(54) CORRECTING OPTICAL DEVICE AND IMAGE PICKUP APPARATUS

(75) Inventors: Makoto Shihoh, Yokohama (JP); Akio Atsuta, Yokosuka (JP); Shinya Kudo, Hirosaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 13/556,857

(22) Filed: Jul. 24, 2012

(65) Prior Publication Data

US 2013/0076922 A1 Mar. 28, 2013

(30) Foreign Application Priority Data

Jul. 28, 2011 (JP) ................................. 2011-165401
Jul. 10, 2012 (JP) ................................. 2012-154364

(51) Int. Cl.
| | |
|---|---|
| *H04N 5/228* | (2006.01) |
| *G02B 27/64* | (2006.01) |
| *H04N 5/232* | (2006.01) |
| *H04N 5/225* | (2006.01) |

(52) U.S. Cl.
CPC .............. *G02B 27/64* (2013.01); *G02B 27/646* (2013.01); *H04N 5/2253* (2013.01); *H04N 5/23248* (2013.01); *H04N 5/23258* (2013.01); *H04N 5/23287* (2013.01)

(58) Field of Classification Search
USPC .................................. 348/208.1, 208.2, 208.4
See application file for complete search history.

(56) References Cited

U.S. PATENT DOCUMENTS

| | | | |
|---|---|---|---|
| 2006/0113868 A1* | 6/2006 | Sakatani et al. | 310/323.17 |
| 2007/0108870 A1* | 5/2007 | Atsuta | 310/317 |
| 2008/0187301 A1* | 8/2008 | Takahashi | 396/55 |

FOREIGN PATENT DOCUMENTS

| | | | |
|---|---|---|---|
| JP | 2000-231129 A | 8/2000 | |
| JP | 3397536 B2 | 4/2003 | |
| JP | 2006-119249 A | 5/2006 | |
| JP | 2007-333850 | * 12/2007 | ............... G03B 5/00 |
| JP | 2007-333850 A | 12/2007 | |
| JP | 2008-70613 A | 3/2008 | |
| JP | 2010-128385 A | 6/2010 | |
| JP | 2011-180509 A | 9/2011 | |
| JP | 2011-242680 A | 12/2011 | |

* cited by examiner

*Primary Examiner* — Roberto Velez
*Assistant Examiner* — Stephen Coleman
(74) *Attorney, Agent, or Firm* — Canon USA Inc. IP Division

(57) ABSTRACT

A correcting optical device according to an aspect of the present invention in which, when image shake is not corrected, a restricting member is caused to engage an engaging portion, to restrict translational movement of a movable member, and in which, when the image shake is corrected, the restricting member is caused to disengage the engaging portion, to cause the movable member to be in a state capable of the translational movement, the restricting member being provided at the rotary member, the engaging portion being provided at the movable member. A driving unit drives the movable member in a direction in which the movable member moves translationally with respect to a fixed member in a plane perpendicular to an optical axis of a correcting lens, so that the correcting lens corrects the image shake, and drives the rotary member in a direction in which the rotary member rotates around the optical axis.

27 Claims, 8 Drawing Sheets

CORRECTING OPTICAL DEVICE AND IMAGE PICKUP APPARATUS

BACKGROUND OF THE INVENTION

1. Field of the Invention

The present invention relates to a correcting optical device that corrects image shake, and to an image pickup apparatus. More particularly, the present invention relates to a correcting optical device including a holding mechanism that holds a correcting lens that is movable for a correcting operation or an image pickup element while the movement of the correcting lens or the image pickup element is restricted, and to an image pickup apparatus.

2. Description of the Related Art

Hitherto, correcting optical devices including a correcting optical system that prevents image shake by translationally moving a correcting lens in a plane that is perpendicular to an optical axis have been known.

Of such correcting optical devices, correcting optical devices including a holding mechanism that, when image shake is not corrected, restricts the movement of a movable part and fixes the movable part are available, the movable part including a correcting lens.

As a correcting optical device including such a holding mechanism, Japanese Patent No. 3397536 discloses a correcting optical device that restricts the movement of a correcting lens by engaging a projection of a supporting frame of the correcting lens with an inner side surface of a lock ring as a result of rotating the lock ring.

However, in Japanese Patent No. 3397536, a driving unit that rotates the lock ring is required for causing the state of the movable part including the correcting lens to be switched from a fixed state to a movable state, that is, to a correctable state.

Further, it is necessary to separately provide an actuator that maintains the lock ring in the correctable state. Therefore, for example, the size, costs, and power consumption of the device are increased. Consequently, satisfactory results are not necessarily obtained in terms of, for example, the size, costs, and power consumption.

In view of such problems, the present invention provides a correcting optical device that makes it possible to reduce size, costs, and power consumption.

SUMMARY OF THE INVENTION

According to an aspect of the present invention, there is provided a correcting optical device configured to correct image shake using a correcting lens on one hand and to restrict movement of the correcting lens when the image shake is not corrected on another hand. The correcting optical device includes a fixed member that rotatably supports a rotary member in a plane that is perpendicular to an optical axis of the correcting lens; a movable member where the correcting lens is supported so as to be movable translationally with respect to the fixed member in the plane that is perpendicular to the optical axis of the correcting lens; and a driving unit that is disposed between the movable member and the rotary member. In the correcting optical device, on the one hand, the driving unit drives the movable member in a direction in which the movable member moves translationally with respect to the fixed member in the plane that is perpendicular to the optical axis of the correcting lens, so that the correcting lens corrects the image shake. On the other hand, the driving unit drives the rotary member in a direction in which the rotary member rotates around the optical axis of the correcting lens, so that, when the image shake is not corrected, the driving unit causes a restricting member to engage an engaging portion, to restrict the translational movement of the movable member, and so that, when the image shake is corrected, the driving unit causes the restricting member to disengage the engaging portion, to cause the movable member to be in a state capable of the translational movement. The restricting member is provided at the rotary member. The engaging portion is provided at the movable member.

According to another aspect of the invention may correct image shake using an image pickup element.

An alternative aspect of the present invention may include a correcting optical device comprising a driving unit and a correcting lens. The correcting lens is in either a locked state or a non-locked state. The correcting lens is driven by the driving unit in translational motion that compensates for image shake in a plane perpendicular to the optical axis, when the correcting lens is in the non-locked state. The correcting lens is prevented from translation motion that compensates for image shake in the plane perpendicular to the optical axis by a restricting member, when the correcting lens is in the locked state. The driving unit places the correcting lens in either the locked state or the non-locked state by rotating the correcting lens.

According to aspects of the present invention, it is possible to realize a correcting optical device that makes it possible to reduce size, costs, and power consumption.

Further features of the present invention will become apparent from the following description of exemplary embodiments with reference to the attached drawings.

DESCRIPTION OF THE EMBODIMENTS

Modes for carrying out the present invention will be described on the basis of the following exemplary embodiments.

Exemplary Embodiments
First Exemplary Embodiment

An exemplary structure of a correcting optical device which corrects image shake using a correcting lens to which the present invention is applied on the one hand, and which restricts the movement of the correcting lens when the image shake is not corrected on the other hand is described as a first exemplary embodiment with reference to FIGS. 1 to 6.

Figure 6:
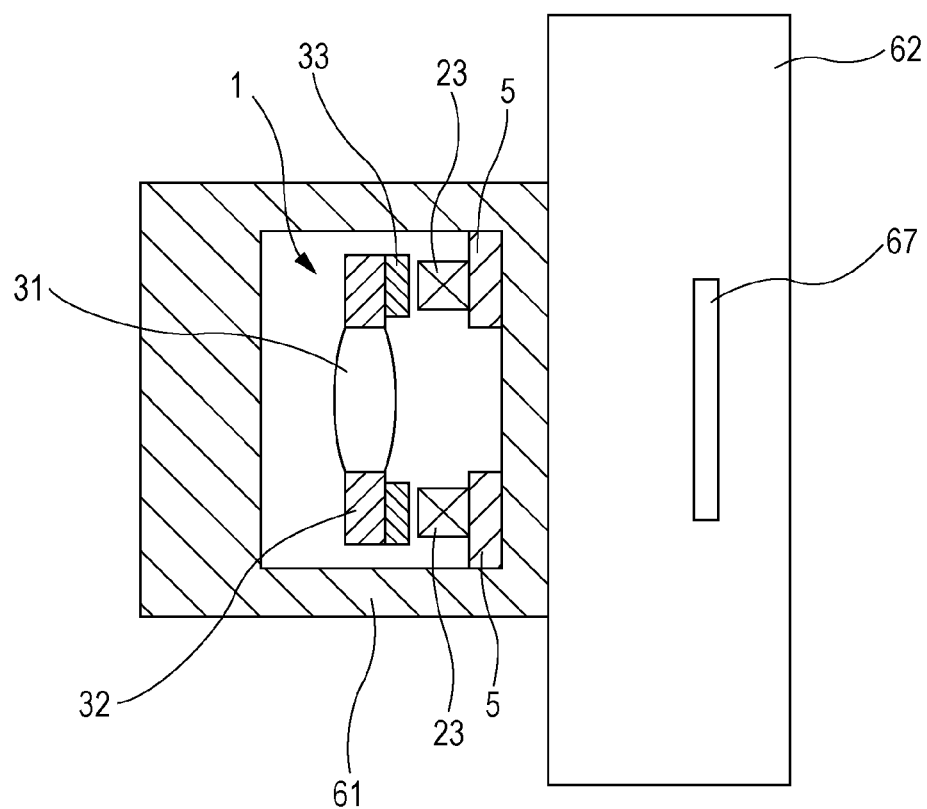
FIG. 6 is a sectional view of a camera when an image pickup apparatus according to the first exemplary embodiment of the present invention is formed.

FIG. 6 is a sectional view of a camera as an image pickup apparatus according to the first exemplary embodiment of the present invention. The camera in FIG. 6 takes a moving image and photographs a still image. Reference numeral 61 denotes a lens barrel. Reference numeral 62 denotes a camera body. Reference numeral 1 denotes a correcting optical device that is built in the lens barrel 61. The correcting optical device 1 according to the exemplary embodiment includes a correcting lens 31, a moving plate (movable member) 32 that holds the correcting lens 31, and a driving device that moves the moving plate 32.

The driving device includes drive coils 23 and permanent magnets 33. The drive coils 23 are secured to a rotary ring (rotary member) 5 that is rotatably supported at the correcting optical device 1. The permanent magnets 33 are supported at the moving plate 32. Although not shown in FIG. 6, the lens barrel 61 is provided with optical systems other than the correcting lens 31, an acceleration sensor that detects the movement of the lens barrel 61, and encoders that detect two-dimensional movement of the moving plate 32. Further, a power supply that supplies electrical energy to the driving device, and a controlling section that operates the power supply by processing an acceleration sensor signal and an encoder signal are provided.

An image pickup element 67 is provided in the camera body 62. Light from an object passes through an optical system including the correcting lens 31 in the lens barrel 61, and is incident upon the image pickup element 67 in the camera body 62. By moving the correcting lens 31 by the correcting optical device 1 on the basis of the acceleration sensor signal, image shake can be corrected.

Figure 1:
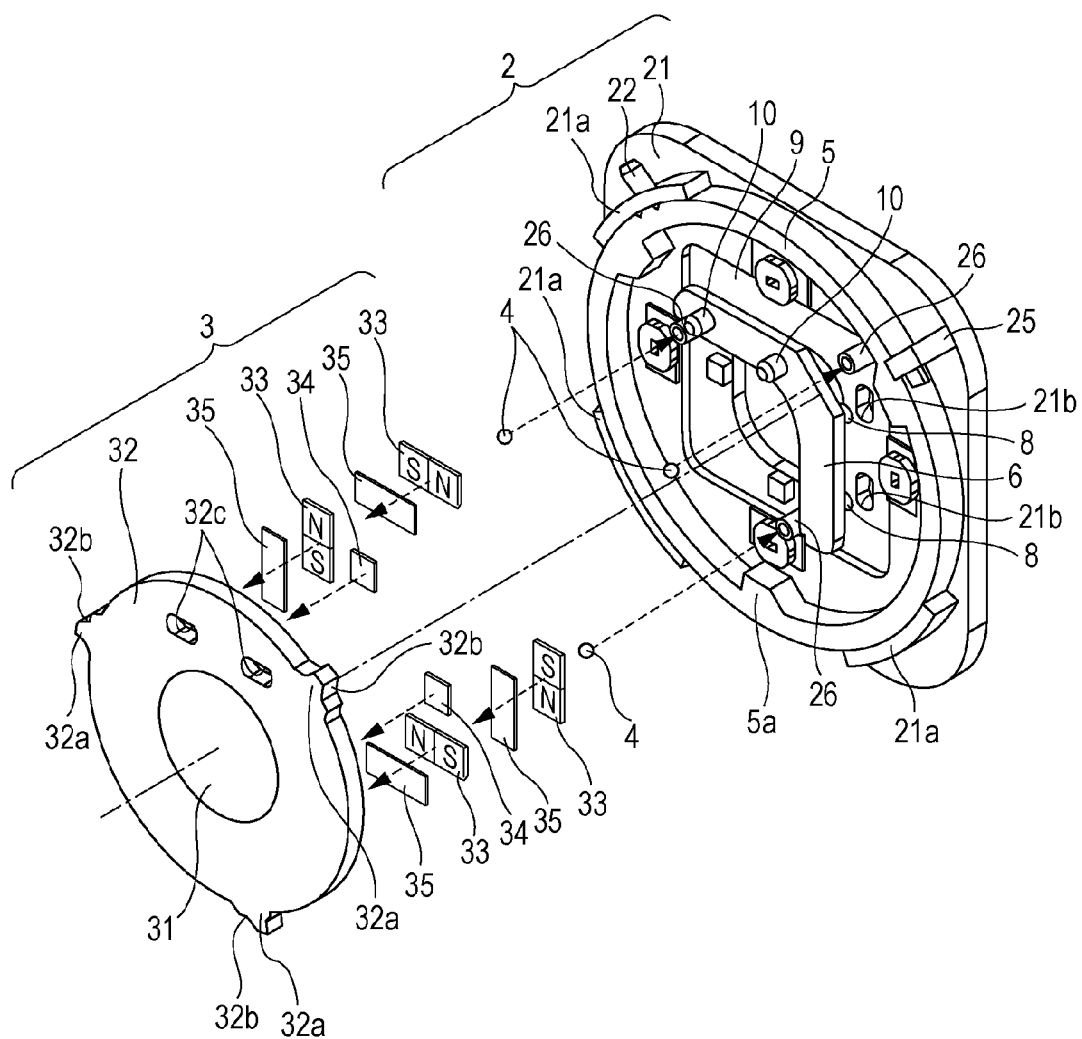
FIG. 1 is an exploded perspective view of a correcting optical device according to a first exemplary embodiment of the present invention.

FIG. 1 is an exploded perspective view of a correcting optical device according to a first exemplary embodiment of the present invention. In FIG. 1, the correcting optical device 1 includes a fixed unit 2, a movable unit 3, and three balls 4. The fixed unit 2 is integrally secured to a photographic lens body (not shown). The movable unit 3 includes the correcting lens 31, and changes its position relative to the fixed unit 2. The three balls 4 are disposed between fixed unit 2 and the movable unit 3.

Figure 2:
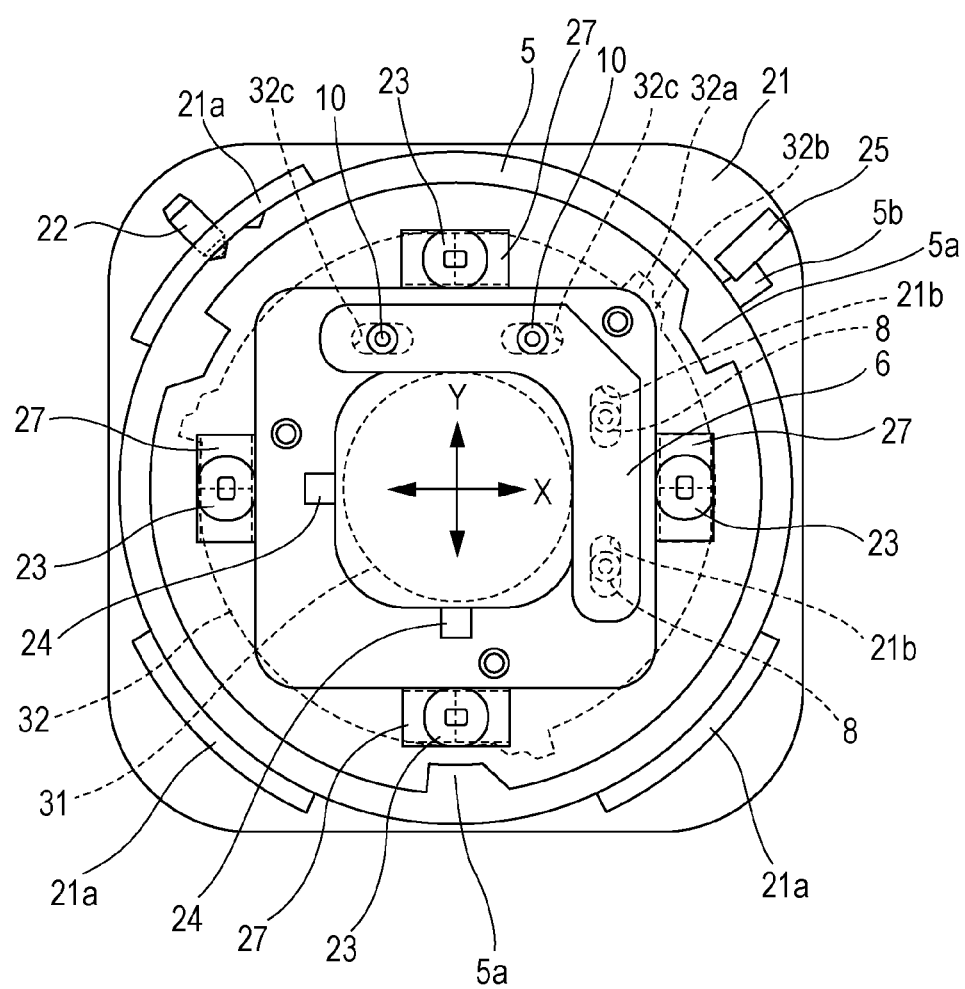
FIG. 2 is a plan view of the correcting optical device when it is unlocked in the first exemplary embodiment of the present invention.

FIG. 2 is a front view of the fixed unit 2. Here, the correcting lens 31 of the movable unit 3 and the moving plate 32 that supports the correcting lens 31 are indicated by broken lines. The fixed unit 2 includes a support plate (fixed member) 21, serving as a base member, and a rotary ring 5, rotatably supported with respect to the support plate 21. Three arc-shaped guiding members 21a for guiding the rotary ring 5 are provided at the support plate 21. Four drive coils 23 are provided at the rotary ring 5 so as to be secured thereto every substantially 90 degrees. Rectangular yokes 27 formed of a magnetic material are provided at a back side, that is, a rotary-ring-5 side of the respective drive coils 23. Two encoders 24 that detect the position of the movable unit 3 are provided at the support plate 21. The rotary ring 5 is restricted so that it cannot be moved by a unit (not shown) in an optical axis direction. Ball bearings 26 that receive the three balls 4 disposed between the fixed unit 2 and the movable unit 3 are provided. Three projections 5a that project inwardly are provided at the rotary ring 5.

A ball plunger 22 is provided at one of the arc-shaped guiding members 21a, and positions a rotational position of the rotary ring 5. This positioning mechanism is described with reference to FIGS. 4A to 4C. The ball plunger 22 includes a ball 22a that is exposed from one end thereof. The ball 22a is urged by an internal spring. When the ball 22a is pressed by a predetermined pressing force, the ball 22a retracts, whereas, when the pressing force no longer provided, the ball 22a returns to its original position. An external thread is formed at a side surface of the ball plunger 22, and engages an internal thread that is formed in the arc-shaped guiding member 21a. Reference numeral 41 denotes a nut. After positioning the ball plunger 22, by tightening the nut 41, the ball plunger 22 is secured.

Figure 4A:
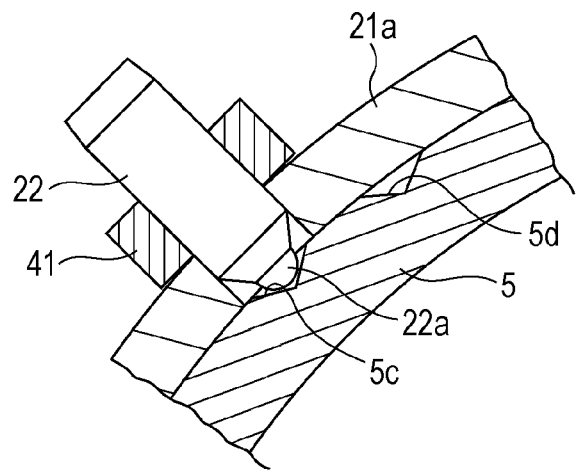
FIGS. 4A to 4C show in detail a positioning mechanism in the first exemplary embodiment of the present invention.
Figure 4B:
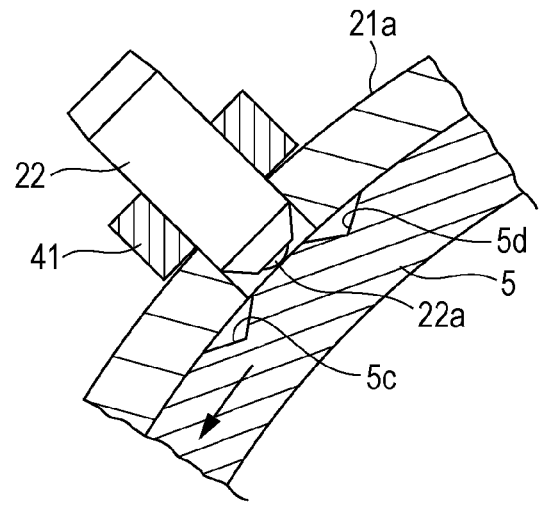
Figure 4C:
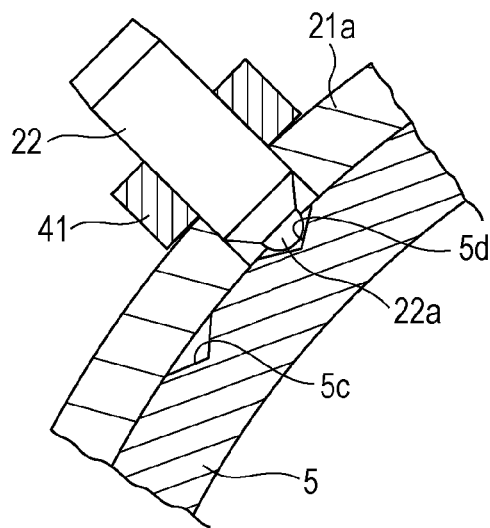

Positioning grooves 5c and 5d are formed in the rotary ring 5. When the rotary ring 5 is situated in the position shown in FIG. 4A, the ball 22a of the ball plunger 22 is fitted into the positioning groove 5c, so that the rotary ring 5 is positioned at the illustrated rotational position. When a rotational force is applied to the rotary ring 5 in a counterclockwise (CCW) direction by a predetermined amount or more, the ball 22a is pressed against an oblique surface of the positioning groove 5c and retracts, so that the rotary ring 5 rotates as shown in FIG. 4B. As shown in FIG. 4C, when the positioning groove 5d rotates up to the position of the ball 22a, the ball 22a is pressed again by the urging force of the spring, and is fitted into the positioning groove 5d. When the rotational force with respect to the rotary ring 5 is no longer provided at this time, the rotary ring 5 is positioned at the position shown in FIG. 4C. When the rotary ring 5 is returned to the position shown in FIG. 4A, a rotational force of a predetermined amount or more may be applied to the rotary ring 5 in a clockwise (CW) direction.

Figure 3:
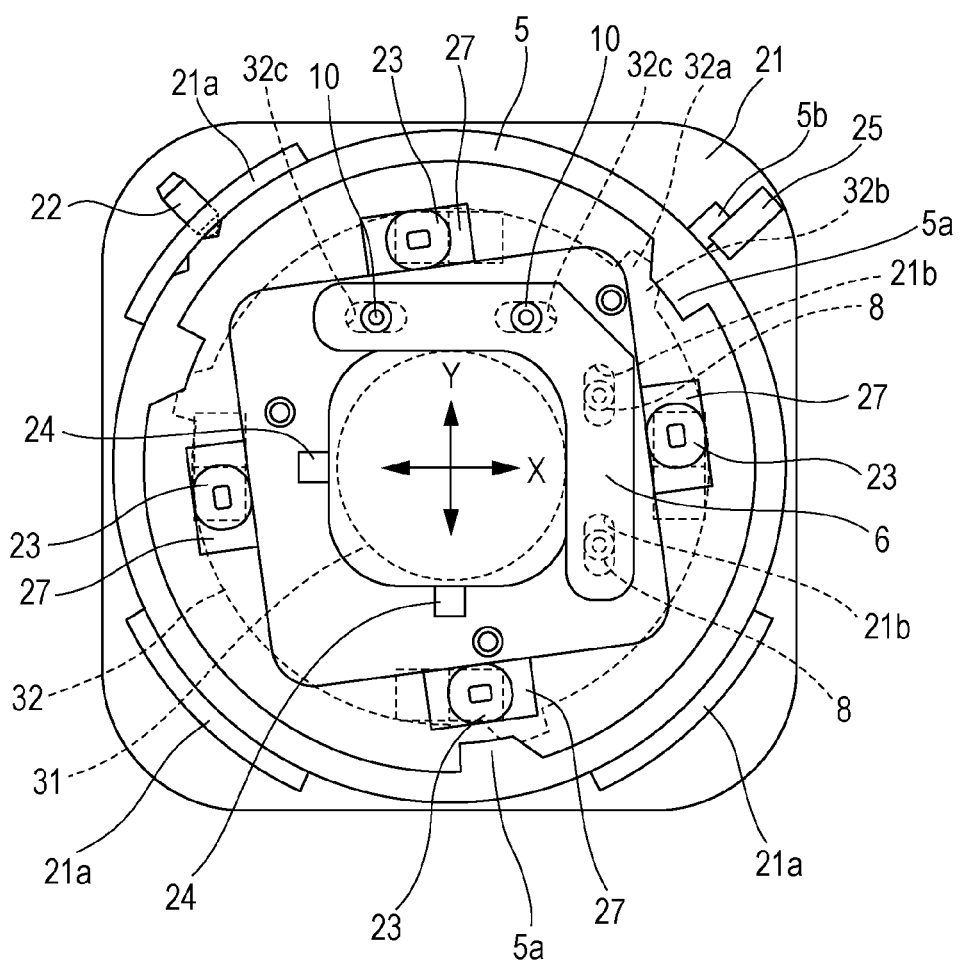
FIG. 3 is a plan view of the correcting optical device when it is locked in the first exemplary embodiment of the present invention.

As shown in FIGS. 2 and 3, a photo-interrupter 25 and a light intercepting plate 5b are provided. The photo-interrupter 25 is mounted to the support plate 21 and serves as a detector that detects the rotational position of the rotary ring 5. The light intercepting plate 5b is formed at a peripheral surface of the rotary ring 5. When the rotary ring 5 is situated at the position shown in FIG. 4A or the position shown in FIG. 4C, the light intercepting plate 5b does not intercept the light of the photo-interrupter 25. When the rotary ring 5 is situated between these positions, such as at the position shown in FIG. 4B, the light intercepting plate 5b intercepts the light of the photo-interrupter 25. Therefore, after applying rotational force to the rotary ring 5, if a signal indicating that the light has been intercepted by the photo-interrupter 25 is issued, it is possible to detect that the rotary ring 5 has started to rotate; and, if a signal indicating that the light has been received again is issued, it is possible to detect that the rotary ring has rotated to a predetermined position.

Two round elongate holes 21b are formed in the support plate 21 in series along a Y direction. Two round elongate holes 32c are formed in the moving plate 32 in series along an X direction. An L-shaped slide plate 6 is provided between the support plate 21 and the moving plate 32. Two bearings 8 and two bearings 10 (a total of four bearings) are rotatably supported at the slide plate 6. The bearings 8 are fitted and inserted in the corresponding round elongate holes 21b of the support plate 21. The bearings 10 are fitted and inserted in the corresponding round elongate holes 32c of the support plate 32. The diameters of the bearings 8 and 10 are such that there is almost no space in the widthwise direction of the round elongate holes 21b and 32c. However, when the bearings 8 and 10 are moved in a longitudinal direction, selection is made so that an outer periphery of each bearing can rotate. Therefore, the slide plate 6 is movable only in the Y direction with respect to the support plate 21, and the moving plate 32 is movable only in the X direction with respect to the slide plate 6.

By virtue of the above-described structure, although the moving plate 32 is capable of moving translationally in the X direction and the Y direction with respect to the support plate 21, the moving plate 32 is not capable of rotating with respect to the support plate 21 even if a rotational force is applied to the moving plate 32.

The movable unit 3 includes the non-magnetic moving plate 32 and the rectangular permanent magnets 33. The moving plate 32 holds a correcting optical system 31 that corrects image shake. The permanent magnets 33 are provided so as to oppose the drive coils 23. Back yokes 35 formed of a magnetic material for forming a closed magnetic path are provided behind the respective permanent magnets 33, that is, at the side of the moving plate 32. Three outwardly projecting projections 32a are provided at the moving plate 32. The movable unit 3 further includes encoder scales 34 that are disposed so as to oppose the encoders 24.

The permanent magnets 33, the encoder scales 34, and the back yokes 35 move together with the moving plate 32. As shown in FIG. 1, the permanent magnets 33 are magnetized so that one side of a central line serving as a boundary is the N pole and the other side of the central line is the S pole. The permanent magnets 33 and the encoder scales 34 are large enough so as not to be removed from the drive coils 23 and the encoders 24 of the fixed unit 2 even if the movable unit 3 moves maximally within a range of displacement. By such a structure, the movable unit 3 is attracted towards the fixed unit 2 by a magnetic force that is applied to the yokes 27 by the permanent magnets 33.

The three balls 4 are interposed between the support plate 21 and the moving plate 32, and are placed in holes of the ball bearings 26 disposed at the support plate 21. As the moving plate 32 moves, the balls 4 rotate in the holes of the ball bearings 26, so that it is possible to freely move the moving plate 32 in a plane that is perpendicular to an optical axis, and to support the moving plate 32 so that there is always a certain gap between it and the support plate 21.

Next, a method of driving the movable unit 3 will be described.

Figure 5:
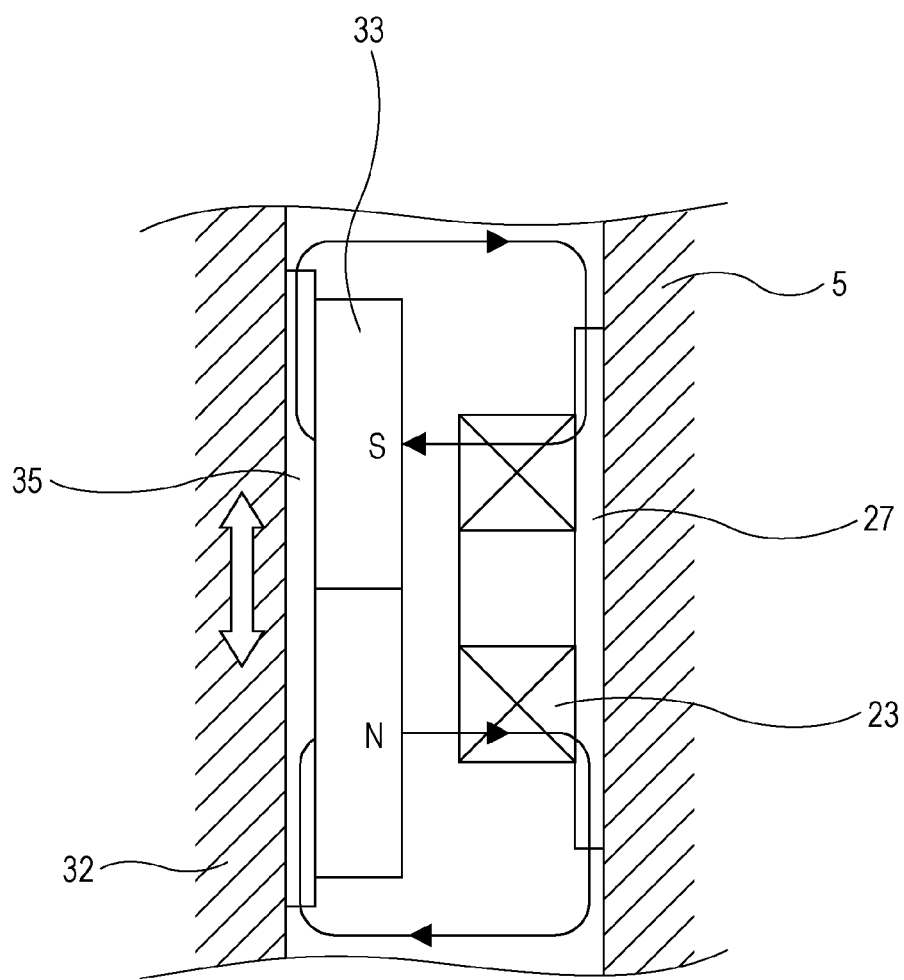
FIG. 5 is a sectional view of the vicinity of a driving section in the first exemplary embodiment of the present invention.

FIG. 5 is a sectional view of the vicinity of a driving section. In the state shown in FIG. 5, the center of each drive coil 23 is on the central line of the corresponding permanent magnet 33. The magnetic force of each permanent magnet 33 generates magnetic lines of force as shown by the arrows in FIG. 5. Therefore, when electric current is caused to flow through each drive coil 23 so as to generate a magnetic field from right to left in FIG. 5, a force that moves the movable unit 3 downward is generated. When a reverse electric current is caused to flow through each drive coil 23, a force that moves the movable unit 3 upward is generated. By individually applying electric current to the four drive coils 23, it is possible to translationally move the movable unit 3 in the plane that is perpendicular to the optical axis of the correcting lens.

Next, a method of controlling the lens driving unit 1 in an image shake correction mode will be described. In the image shake correction mode, first, an image shake amount is input to a lens driving unit CPU (not shown) from a vibration detecting sensor (not shown) of a lens body or a camera. The CPU calculates a drive amount of the correcting optical system that is required for correcting the image shake from the input image shake amount, and outputs the drive amount based thereupon as a drive signal to the four drive coils 23. The drive coils 23 generate magnetic fields on the basis of the output signal, and translationally move the moving plate 32 in the plane that is perpendicular to the optical axis. When the two encoders 24 (provided at the support plate 21) read the encoder scales 34, positional information of the moving plate 32 is detected and fed back to the CPU. On the basis of the fed back positional information and the image shake amount newly input from the vibration detecting sensor, the CPU calculates the drive amount of the correcting optical system, and outputs to the drive coils 23 a drive signal obtained from the calculation. By repeating the above-described operations, the lens driving unit 1 continuously corrects image shake.

Next, a method of locking and unlocking the movable unit will be described with reference to FIGS. 2 and 3. First, an operation of switching from an image-shake-correction-function on state to an image-shake-correction-function off state, that is, to a locked state of the movable unit will be described.

In FIG. 2, in the image-shake-correction-function on state, since, at this time, the movable unit 3 does not contact the rotary ring 5 at all, the movable unit 3 is capable of moving translationally in the plane that is perpendicular to the optical axis. The rotary ring 5 is positioned at the illustrated position by the ball plunger 22, and is moved to one side by an urging force of the ball plunger 22. When the correcting optical device 1 receives an image-shake-correction-function off signal from the camera or a lens, the CPU outputs a drive signal to each drive coil 23, so that the center of the correcting lens 31 substantially coincides with the optical axis. Thereafter, the drive signal is applied so as to apply a rotational force in a CW direction to the movable unit 3. However, since, as mentioned above, the movable unit 3 cannot rotate with respect to the support plate 21, an opposing force of the rotational force is applied to the rotary ring 5 that supports the drive coils 23. Since the rotational force at this time is large enough to press the ball 22a of the ball plunger 22 against the urging force, the rotary ring 5 rotates in the CCW direction.

When the photo-interrupter 25 detects that the rotary ring 5 has rotated to the position shown in FIG. 3, the output of the drive signal to the drive coils 23 is stopped. When the ball 22a of the ball plunger 22 is fitted into the positioning groove 5c, the rotary ring 5 is positioned at the position shown in FIG. 3. Here, since the projections (restricting members) 5a of the rotary ring 5 engage recess portions (engaging portions) 32b, formed in the projections 32a of the moving plate 32, the movable unit 3 can no longer move in any direction. Therefore, the state of the movable unit 3 is switched to the image-shake- correction-function off state, that is, to the locked state.

Next, a method of unlocking the movable unit 3 will be described. In unlocking the movable unit and returning to the image shake correction mode, a drive signal is output to each drive coil 23 from the locked state shown in FIG. 3, and the drive signal is applied so that a rotational force in the CCW direction is applied to the movable unit 3. However, since the movable unit 3 cannot rotate with respect to the support plate 21 as described above, an opposing force of the rotational force is applied to the rotary ring 5 that supports the drive coils 23. The rotational force at this time is large enough to press the ball 22a of the ball plunger 22, so that the rotary ring 5 rotates in the CW direction. When the photo-interrupter 25 detects that the rotary ring 5 has rotated to the position shown in FIG. 2, the output of the drive signal to the drive coils 23 is stopped. When the ball 22a of the ball plunger 22 is fitted into the positioning groove 5d, the rotary ring is positioned at the position shown in FIG. 2. By disengaging the projections 5a of the rotary ring 5 from the recess portions 32b, the movable member is in a translationally movable state. As a result, the movable unit 3 and the rotary ring 5 do not contact each other at all, so that the state of movable member returns to the image-shake-correction-function on state.

By the above-described operation, the correcting optical device 1 is set in the image shake correction mode.

By virtue of the above-described structure, the correcting lens driving unit is capable of serving as a rotational driving unit of the rotary ring (lock ring), so that a separate driving unit specially for locking does not need to be provided. Therefore, it is possible to provide a small correcting optical device that is low in cost and whose power consumption is reduced. Although, in the above-described exemplary embodiment, the drive coils 23 are secured to the rotary ring 5, and the permanent magnets 33 are secured to the moving plate 32, it is possible to secure the permanent magnets 33 to the rotary ring 5 and the drive coils 23 to the moving plate 32.

Second Exemplary Embodiment

In a second exemplary embodiment, an example of a structure that only differs from the first exemplary embodiment in the driving unit will be described with reference to FIG. 7. In the first exemplary embodiment, a motor including drive coils and permanent magnets and that converts electrical energy into mechanical energy by making use of magnetic flux generated by the permanent magnets is used. More specifically, what is called a voice coil motor that uses the drive coils 23 and the permanent magnets 33 is used as the driving unit. However, in the second exemplary embodiment, a vibration wave motor is used instead of the voice coil motor. The vibration wave motor is formed so that, by applying drive signals to electrical-mechanical energy conversion elements, provided at vibrators, ellipsoidal motion including two bending modes (that is, a first bending mode and a second bending mode in which nodal lines are substantially orthogonal to each other) is excited in the vibrators, so that driving force is generated by friction at a contact portion with the vibrators.

Figure 7:
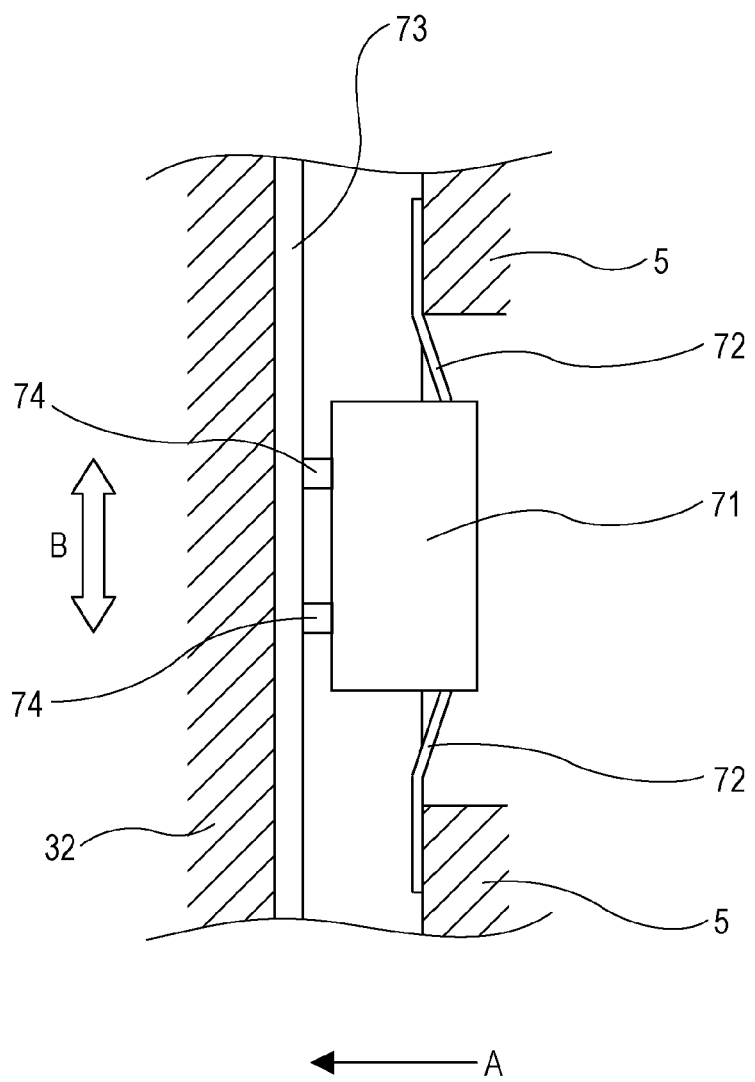
FIG. 7 is a sectional view of the vicinity of a driving section in a second exemplary embodiment of the present invention.

FIG. 7 is a sectional view of the vicinity of a vibration wave motor 71. In a state in which a fixed unit 2 and a movable unit 3 are supported, the vibration wave motor 71 is in contact with a friction plate (friction member) 73, secured to a moving plate 32, while a leaf spring 72, secured to a rotary ring 5, is flexed. By flexing the leaf spring 72, two contact portions 74 of the vibration wave motor 71 are in contact with the friction plate 73 by receiving at all times an urging force of the leaf spring 72 in the direction of arrow A in FIG. 7. Two vibratory modes are generated at the contact portions 74 of the vibration wave motor 71 by driving piezoelectric elements (electrical-mechanical energy conversion elements) that are not shown.

The two vibratory modes are a vibratory mode for push-up moving in a push-up direction (in the direction of arrow A) and a vibratory mode for moving in a forward movement direction (in the direction of arrow B).

By combining these two vibratory modes, ellipsoidal motion is produced in the contact portions 74, so that driving force in the directions of a double-headed arrow B is transmitted to the friction plate 73. Four of the vibration wave motors 71 individually vibrate, so that the moving plate 32 moves translationally in a plane that is perpendicular to an optical axis. By applying the driving force to four of the vibration wave motors 71 in the same direction, it is possible to rotate the rotary ring 5 and lock the movable unit 3.

Third Exemplary Embodiment

In the first and second exemplary embodiments, the present invention is applied to image pickup apparatuses that prevent image shake by translationally moving a correcting lens included in an image pickup lens. However, the present invention may also be applied to image pickup apparatuses that prevent image shake by translationally moving an image pickup element. The structure of the third exemplary embodiment is similar to those of the first and second exemplary embodiments except the function of preventing the image shake is provided by an image pickup element instead of a correcting lens.

The third exemplary embodiment will be described with reference to FIG. 8. Reference numeral 161 denotes a lens barrel. Reference numeral 162 denotes a camera body. Reference numeral 101 denotes an image shake correcting device that is built in the camera body 162. The image shake correcting device 101 according to the third exemplary embodiment includes an image pickup element 167, a moving plate (movable member) 132 that holds the image pickup element 167, and a driving device that moves the moving plate 132. Similar to the first exemplary embodiment, the moving plate 132 is supported such that the moving plate 132 is capable of moving translationally only in the X direction and the Y direction. In addition, similar to the first exemplary embodiment, the image shake correcting device 101 includes a support plate (fixed member), serving as a base member, and a rotary ring (rotary member) 105, rotatably supported with respect to the support plate. The driving device includes four drive coils 123 and four permanent magnets 133 (In FIG. 8, only two drive coils 123 and two permanent magnets 133 are shown). The drive coils 123 are secured to the rotary ring (rotary member) 105 that is rotatably supported at the image shake correcting device 101. The permanent magnets 133 are supported at the moving plate 132. Also in the third exemplary embodiment, a vibration wave motor may, of course, be used as the driving device as in the second exemplary embodiment.

Figure 8:
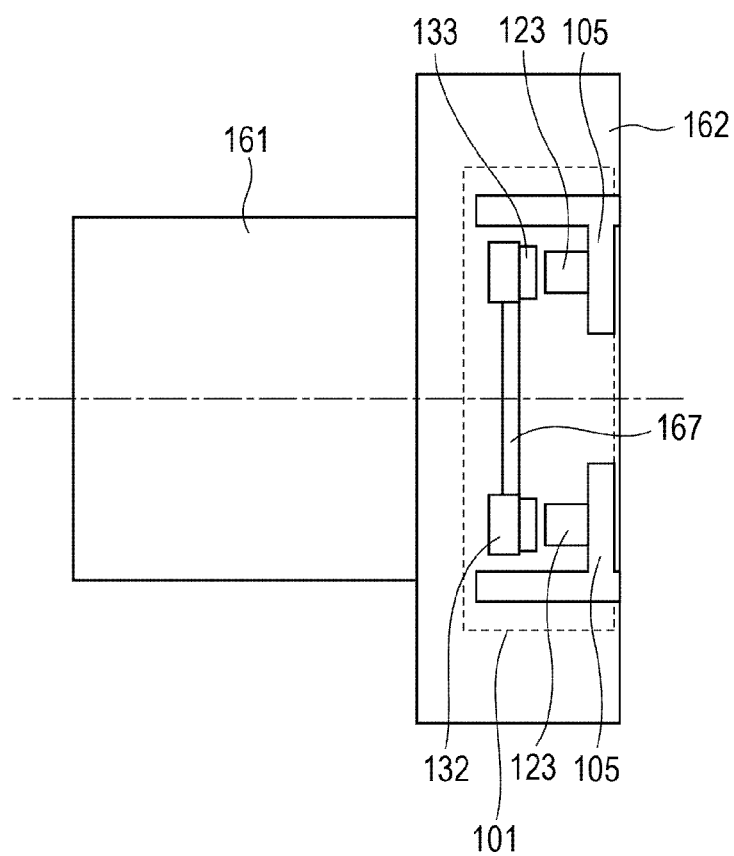
FIG. 8 is a sectional view of a camera when an image pickup apparatus according to a third exemplary embodiment of the present invention is formed.

Although not shown in FIG. 8, the lens barrel 161 is provided with an image pickup optical system and the camera body 162 is provided with an acceleration sensor that detects the movement and encoders that detect two-dimensional movement of the moving plate 132. Further, a power supply that supplies electrical energy to the driving device, and a controlling section that operates the power supply by processing an acceleration sensor signal and an encoder signal are provided.

The image pickup element 167 is provided in the camera body 162. Light from an object passes through the image pickup optical system including a lens in the lens barrel 161, and is incident upon the image pickup element 167. By moving the image pickup element 167 by the image shake correcting device 101 on the basis of the acceleration sensor signal, image shake can be corrected. The movement of the image pickup element 167 is similar to the movement of the correcting lens in the first exemplary embodiment. When a driving force is applied to the driving device including the four drive coils 123 and the four permanent magnets 133, the image pickup element 167 moves translationally in a plane that is perpendicular to the optical axis of the lens. However, when the driving force is applied to the driving device so as to apply the rotational force around the optical axis, the moving plate 132 does not rotate. The rotary ring 105 is rotated by the opposing force, and it is possible to lock the movable unit 3 including the moving plate 132. The positioning mechanism, the locking/unlocking mechanism, etc., are similar to those in the first exemplary embodiment, and explanations thereof are thus omitted.

In the third exemplary embodiment, the image pickup element driving unit is capable of serving as a rotational driving unit of the rotary ring (lock ring), so that a separate driving unit specially for locking does not need to be provided. Therefore, it is possible to provide a small image pickup apparatus that is low in cost and whose power consumption is reduced. In the image shake correcting device that moves the image pickup element, the image pickup element cannot be rotated to restrict the movement of the image pickup element and fix the image pickup element. Therefore, the mechanism of the present invention is preferable.

Fourth Exemplary Embodiment

The present invention is applied to an image pickup apparatus, such as a camera, in the first to third exemplary embodiments. However, the present invention may also be applied to a fine feeding mechanism, such as an XY stage. For example, a microscope used to observe a biological material or the like includes a fine feeding mechanism for positioning a desired portion of an object to be observed to a position where the portion can be observed by the microscope.

In the fine feeding mechanism, when a movable part, that is, a part for receiving the object to be observed, can be directly moved translationally by a plurality of driving units as in the present invention, the thickness of the fine feeding mechanism can be reduced. As a result, the size and weight of the microscope can be reduced. In this type of fine feeding mechanism, a position restricting mechanism for fixing the part for receiving the object to be observed is preferably provided to prevent breakage due to, for example, impact when the microscope is carried.

According to the present invention, the driving unit of the fine feeding mechanism is capable of serving as the driving unit of the position restricting mechanism for stopping the part for receiving the object to be observed. Therefore, it is possible to provide a fine feeding mechanism that is low in cost and whose power consumption is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-165401, filed Jul. 28, 2011, and Japanese Patent Application No. 2012-154364, filed Jul. 10, 2012, which are hereby incorporated by reference herein in their entirety.

What is claimed is:

1. A correcting optical device comprising:
a fixed member configured to rotatably support a rotary member in a first plane that is perpendicular to an optical axis of a correcting lens;
a movable member where the correcting lens is supported so as to be movable with respect to the fixed member in the plane in a second plane parallel to the first plane; and
a driving unit that is disposed between the movable member and the rotary member and between the movable member and the fixed member,
wherein the driving unit drives the movable member with respect to the fixed member in a direction in the second plane, and
wherein the driving unit drives the rotary member to rotate around the optical axis of the correcting lens,
so that the driving unit causes a restricting member to engage an engaging portion to restrict the translational movement of the movable member, and
so that the driving unit causes the restricting member to disengage the engaging portion, to cause the movable member to be in a state capable of the translational movement, the restricting member being provided at the rotary member, and the engaging portion being provided at the movable member.

2. The correcting optical device according to claim 1, wherein the driving unit includes a motor including a drive coil and a permanent magnet, the motor converting electrical energy into mechanical energy by making use of magnetic flux that is generated by the permanent magnet, and wherein the drive coil is provided at the rotary member and the permanent magnet is provided at the movable member, or the drive coil is provided at the movable member and the permanent magnet is provided at the drive coil.

3. The correcting optical device according to claim 1, wherein the driving unit includes a vibration wave motor that, by applying a drive signal to an electrical-mechanical energy conversion element, excites ellipsoidal movement in a vibrator, to generate driving force by friction at a contact portion with the vibrator, the electrical-mechanical energy conversion element being provided at the vibrator, the ellipsoidal motion generated by two bending modes, a first bending mode and a second bending mode, in which nodal lines cross each other.

4. An image pickup apparatus comprising:
the correcting optical device according to claim 1; and
an image pickup element provided at a position upon which light that has passed through the correcting lens of the correcting optical device is incident.

5. The image pick up apparatus according to claim 1, wherein:
in an image-shake-correction function off state, the driving unit causes the restricting member to engage the engaging portion,
in an image-shake-correction function on state, the driving unit causes the restricting member to disengage the engaging portion, and
the driving unit is configured to move an image pickup element in the image- shake-correction function on state.

6. The correcting optical device according to claim 1, further comprising a member configured to prevent the movable member from rotating with respect to the fixed member.

7. The correcting optical device according to claim 6, wherein the member comprises:
a body;
a first bearing configured to prevent the movable member from rotating with respect to the body; and
a second bearing configured to prevent the body from rotating with respect to the fixed member.

8. The correcting optical device according to claim 7, wherein the first hole is formed in the movable member;
wherein a second hole is formed in the fixed member, and
wherein the first bearing and the second bearing are inserted in the first hole and the second hole, respectively.

9. An image pick up apparatus comprising:
a fixed member that rotatably supports a rotary member in a first plane that is perpendicular to an optical axis of a lens;
a movable member that is supported so as to be movable with respect to the fixed member in a second plane parallel to the first plane; and
a driving unit that is disposed between the movable member and the rotary member,
wherein the driving unit drives the movable member in a direction in which the movable member moves with respect to the fixed member in the second plane in an image-shake-correction function on state, and
wherein the driving unit drives the rotary member in a direction in which the rotary member rotates around the optical axis,
so that the driving unit causes a restricting member to engage an engaging portion to restrict the translational movement of the movable member, and
so that the driving unit causes the restricting member to disengage the engaging portion to cause the movable member to be in a state capable of the translational movement, the restricting member being provided at the rotary member, and the engaging portion being provided at the movable member.

10. The image pickup apparatus according to claim 9, wherein the driving unit includes a motor including a drive coil and a permanent magnet, the motor converting electrical energy into mechanical energy by making use of magnetic flux that is generated by the permanent magnet, and wherein the drive coil is provided at the rotary member and the permanent magnet is provided at the movable member, or the drive coil is provided at the movable member and the permanent magnet is provided at the drive coil.

11. The image pickup according to claim 9, wherein the driving unit includes a vibration wave motor that, by applying a drive signal to an electrical-mechanical energy conversion element, excites ellipsoidal movement in a vibrator, to generate driving force by friction at a contact portion with the vibrator, the electrical-mechanical energy conversion element being provided at the vibrator, the ellipsoidal motion generated by two bending modes, a first bending mode and a second bending mode cross each other.

12. An image pickup apparatus comprising:
   the correcting optical device according to claim 9; and
   a lens through which light passes, the light being incident on the image pickup element of the correcting optical device.

13. The image pick up apparatus according to claim 9, wherein:
   in an image-shake-correction function off state, the driving unit causes the restricting member to engage the engaging portion,
   in an image-shake-correction function on state, the driving unit causes the restricting member to disengage the engaging portion, and
   the driving unit is configured to move an image pickup element in the image-shake-correction function on state.

14. The image pick up apparatus according to claim 9, further comprising a member configured to prevent the movable member from rotating with respect to the fixed member.

15. The image pick up apparatus according to claim 14, wherein the member comprises:
   a first bearing configured to prevent the movable member from rotating with respect to the member; and
   a second bearing configured to prevent the member from rotating with respect to the fixed member.

16. The image pick up apparatus according to claim 15, wherein a first hole is formed in the movable member, wherein a second hole is formed in the fixed member, and wherein the first bearing and the second bearing are inserted in the first and second hole, respectively.

17. The device according to claim 16, further comprising a member configured to engage the fixed member and the movable member and to be contactless with the rotary member.

18. The device according to claim 17, wherein the member comprises:
   a body;
   a first bearing configured to prevent the movable member from rotating with respect to the body; and
   a second bearing configured to prevent the body from rotating with respect to the fixed body.

19. The correcting optical device according to claim 18, wherein a first hole is formed in the movable member, wherein a second hole is formed in the fixed member, and wherein the first bearing and the second bearing are inserted in the first hole and the second hole, respectively.

20. A correcting optical device comprising:
   a driving unit;
   a correcting lens wherein:
      the correcting lens is in either a locked state or a non-locked state; wherein
      the correcting lens is driven by the driving unit in translational motion in a plane perpendicular to an optical axis of the correcting lens, when the correcting lens is in the non-locked state; and
      the correcting lens is prevented from translation motion in the plane by a restricting member, when the correcting lens is in the locked state; and
      the driving unit places the correcting lens in either the locked state or the non-locked state without rotating the correcting lens.

21. A device comprising:
   a fixed member;
   a rotary member supported by the fixed member so that the rotary member is rotatable in a first plane, the rotary member comprising a restricting member;
   a movable member configured to be movable with respect to the fixed member in a second plane parallel to the first plane, the movable member comprising an engaging portion capable of engaging the restricting member; and
   a driving unit that is disposed between the movable member and the rotary member and between the movable member and the fixed member,
   wherein the driving unit is configured to drive the movable member with respect to the fixed member in a direction in the second plane in a first state,
   wherein the driving unit is configured to drive the rotary member to rotate around an axis which crosses the first plane in a second state, and
   wherein the fixed member, the rotary member, and the movable member are configured so that the rotary member rotates with respect to the fixed member and the movable member in the second state.

22. The device according to claim 21, wherein the driving unit includes a motor including a drive coil and a permanent magnet, the motor converting electrical energy into mechanical energy by making use of magnetic flux that is generated by the permanent magnet, and
   wherein the drive coil is provided at the rotary member and the permanent magnet is provided at the movable member, or the drive coil is provided at the movable member and the permanent magnet is provided at the drive coil.

23. An image pickup apparatus comprising:
   the device according to claim 21 wherein the movable member holds an image pickup element; and
   a lens through which light passes, the light being incident on the image pickup element of the correcting optical device.

24. An image pickup apparatus comprising:
   the device according to claim 21 wherein the movable device holds a correcting lens; and
   an image pickup element provided at a position upon which light that has passed through the correcting lens of the correcting optical device is incident.

25. A stage comprising the device according to claim 21.

26. The device according to claim 21, wherein the driving unit includes a vibration wave motor.

27. The device according to claim 26, wherein the driving unit includes a vibration wave motor that, by applying a drive signal to an electrical-mechanical energy conversion element, excites ellipsoidal movement in a vibrator, to generate driving force by friction at a contact portion with the vibrator, the electrical-mechanical energy conversion element being provided at the vibrator, the ellipsoidal motion generated by two bending modes, a first bending mode and a second bending mode, in which nodal lines crosses each other.

* * * * *